United States Patent [19]
O'Shea

[11] Patent Number: 6,118,797
[45] Date of Patent: Sep. 12, 2000

[54] USE OF SUB-RATE OUT-OF-BAND CHANNEL TO TRANSPORT SIGNALING BITS OVER TIME DIVISION MULTIPLEXED DIGITAL COMMUNICATION LINK

[76] Inventor: Thomas E. O'Shea, 20 Wysteria Way, Chapel Hill, N.C. 27514

[21] Appl. No.: 09/324,463

[22] Filed: Jun. 2, 1999

[51] Int. Cl.[7] ...................................................... H04J 3/12
[52] U.S. Cl. ............................................................ 370/524
[58] Field of Search .................................. 370/522, 523, 370/527, 337, 341, 348, 532, 540, 476, 524, 525, 526, 437, 438, 439, 468; 379/229, 230, 231

[56] References Cited

U.S. PATENT DOCUMENTS

| | | | |
|---|---|---|---|
| 5,351,239 | 9/1994 | Black et al. | 370/435 |
| 5,528,579 | 6/1996 | Wadman et al. | 370/466 |
| 5,732,127 | 3/1998 | Hayes et al. | 379/115 |
| 5,778,003 | 7/1998 | Puppa et al. | 370/249 |
| 5,818,843 | 10/1998 | Virdee et al. | 370/435 |
| 5,875,191 | 2/1999 | Deschaine et al. | 370/466 |

*Primary Examiner*—Ajit Patel
*Attorney, Agent, or Firm*—Charles E. Wands

[57] ABSTRACT

An out-of-band signaling mechanism for a T-1 multipath digital time division multiplex telecommunication system transports signaling information exclusive of in-band, robbed bit signaling. The out-of-band signaling mechanism reserves a portion of the available bandwidth of a DS0 channel for exclusive transport of signaling information as an out-of-band DS0 signaling channel, and employs the remaining portion of the available bandwidth of that same DS0 channel as a sub-rate data communication DS0 channel.

19 Claims, 3 Drawing Sheets

USE OF SUB-RATE OUT-OF-BAND CHANNEL TO TRANSPORT SIGNALING BITS OVER TIME DIVISION MULTIPLEXED DIGITAL COMMUNICATION LINK

FIELD OF THE INVENTION

The present invention relates in general to digital time division multiplexed (TDM) telecommunication systems, and is particularly directed to an out-of-band signaling mechanism for transporting signaling information for controlling the operation of a plurality of customer premises equipments, in a manner that is exclusive of in-band, robbed bit signaling. The invention reserves a portion of the available bandwidth of a DS0 channel for the exclusive transport of signaling information as an out-of-band DS0 signaling channel, and employs the remaining portion of the available bandwidth of that same DS0 channel as a sub-rate data communication DS0 channel.

BACKGROUND OF THE INVENTION

A common technique for transporting call control signals over a digital telecommunication network, such as, but not limited to a T-1 data rate network, is the use of 'robbed'-bit signaling, in which least significant bits are 'robbed' from selected DS0 communication channels and used instead for the transport of in-band signaling information (termed ABCD bits). Although in-band, robbed bit signaling allows the service provider to use all of the available TDM channels for customer traffic, and has been found to be generally acceptable for the transport of quantized voice, it can constitute a significant impairment to the quality of transported data traffic.

This data traffic degradation problem can become particularly exacerbated in networks containing a plurality of concatenated signaling discontinuities, such as repeaters and/or cross-connect nodes—that do not allow DS1 extended superframe alignment to maintained. Since the robbed bits cannot be tracked across these discontinuities, a series of three dB noise penalties may be incurred. One possible alternative of using one of the (twenty-four) communication channels as an out-of-band channel for the transport of signaling information for the remaining twenty-three 'clear' DS0 communication channels is unacceptable to telecommunication service providers as a cost prohibitive allocation of resources and usurping of useful DS0 bandwidth.

SUMMARY OF THE INVENTION

In accordance with the present invention, this signaling channel problem is successfully obviated by expropriating a portion of one of the N available DS0 channels for the exclusive transport of out-of-band signaling information for all of the DS0 communication channels, and using the remaining bandwidth of that same DS0 channel as an out-of-band, sub-rate data communication channel. Namely, there are (N−1) full-rate DS0 channels and one sub-rate DS0 channel.

The invention will be described for the non-limiting case of a multiple link time division multiplex (TDM) digital communication system, having M digital TDM paths through one or more nodes, such as cross-connects or repeaters for extended range applications. As a non-limiting example, each of the M TDM paths may comprise a T-1 data rate (1.544 Mb/s) digital communication path employing extended superframe (ESF) multiplexing format, super- frame (SF) multiplexing format, TR08 multiplexing format or other standard TDM formats such as SONET. Where M=16, for example, and with twenty-four channels (64 kbps) DS0 time slots) per T-1 path, DS0 communication channel connectivity for up to a plurality of N=384 end user equipments may be provided.

To subdivide one of the N DS0 communication channels into an out-of-band, sub-rate signaling channel and an out-of-band, sub-rate DS0 communication channel, the eight bits of a selected time DS0 slot are divided into a pair of four-bit nibbles. The four most significant bits are employed as a sub-rate, out-of-band 32 kbps communication channel, while the four least significant bits are employed to generate a sub-rate, out-of-band 32 kbps signaling message channel. A signaling channel message for a respective one of the (N=384) communication channels is formed of a plurality of successively transmitted signaling channel nibbles of the subdivided DS0 communication channel. Pursuant to a non-limiting example, described below, a signaling channel message may be derived from six signaling channel nibbles of the selected time slot for six consecutive DS1 frames, yielding a total of twenty-four bits per sub-rate DS0 signaling channel message. This provides for the transport of one complete signaling channel message every 750 μsec., so that at least 384 channels can be serviced every 288 msec.

The message buffer space employed by the communications control processor of a channel unit transceiver installed within an equipment shelf at a terminating station of the multipath digital telecommunication link, is allocated for the storage of 'priority' and 'refresh' mode signaling channel messages. A 'refresh' data store section stores information representative of the current signaling state of each of the (up to N) signaling entities. A 'priority' data store section queues information representative of only changes in signaling states of the signaling entities current state information for which is stored in the 'refresh' data store section.

In the absence of a change in signaling state of a respective signaling entity, it has no associated entry in the priority queue data store section. However, in response to a change in the signaling state information for a respective entity stored in the refresh data store section, that new signaling state information is transferred to the priority queue for priority transport in the out-of-band signaling message channel. Signaling messages are stored in the priority queue in the order received, so that oldest signaling channel requests will be serviced first. In addition, changed signaling state information is updated in the refresh storage area. When the priority queue is empty, refresh signaling messages are transmitted in the signaling channel.

DETAILED DESCRIPTION

Figure 1:
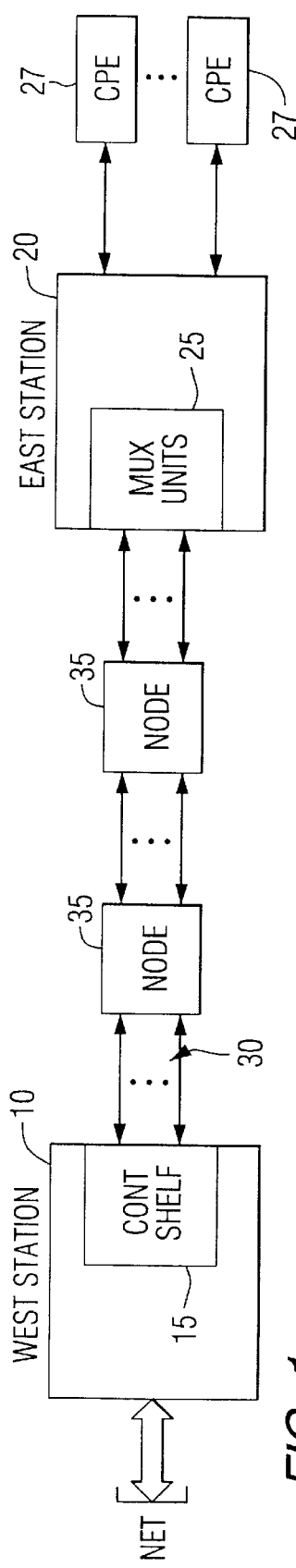
FIG. 1 is a simplified diagrammatic illustration of a digital telecommunication system employing the out-of-band, sub-rate signaling mechanism of the present invention.

Before describing in detail the new and improved sub-rate, out-of-band signaling mechanism in accordance with the present invention, it should be observed that the invention resides primarily in prescribed modular arrangements of conventional digital communication circuits and associated digital signal processing components and attendant supervisory control circuitry therefor, that controls the operations of such circuits and components. In a practical implementation that facilitates their incorporation into a telecommunication equipment shelf, these modular arrangements may be readily implemented as field programmable gate array (FPGA)-implemented, or application specific integrated circuit (ASIC) chip sets.

Consequently, the configurations of such arrangements of circuits and components and the manner in which they are interfaced with other telecommunication equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations are primarily intended to show the major components of the invention in a convenient functional grouping, whereby the present invention may be more readily understood.

Referring now to FIG. 1, a reduced complexity diagram of a multiple link time division multiplex (TDM) digital communication system, employing the usurped sub-rate channel signaling mechanism of the present invention, is shown as comprising a 'west' station 10 and an 'east' station 20 that are installed at opposite ends of a multiple (time M) set of digital TDM paths 30, and which may include one or more nodes 35, such as cross-connects or repeaters for extended range applications. As a non-limiting example, each of the M TDM paths 30 may comprise a T-1 data rate (1.544 Mb/s) digital communication path employing extended superframe (ESF) multiplexing format, superframe (SF) multiplexing format, TR08 multiplexing format or other standard TDM formats such as SONET. Employing M=16 as a non-limiting parametric example, with twenty-four channels (64 kbps) DS0 time slots) per T-1 path, the system of FIG. 1 may provide DS0 channel connectivity for up to a plurality of N=384 end user equipments.

'West' station 10 contains a head end terminal or control shelf 15, the backplane of which supports T-1 multiplexer units which terminate the west ends of the M T-1 paths 30. In a complementary fashion, the 'east' station contains a remote terminal or node shelf having a backplane that is configured to receive a set of T-1 multiplexer units 25 terminating the east ends of the M T-1 paths 30. The T-1 multiplexer units 25 of the east end node shelf include remote channel units that terminate two-wire analog pairs for (up to N=384) end customer equipments 27.

As pointed out above, if in-band robbed bit signaling were employed in the system of FIG. 1, the (concatenated) signaling discontinuities or nodes 35 in the M signaling paths 30 would introduce an unacceptable noise penalty into the transport of data traffic over the network. Also, service providers will not tolerate having to use one of the (twenty-four) DS0 communication channels of a respective T-1 path as an out-of-band channel for the transport of signaling bits for the remaining twenty-three 'clear' communication channels for that T-1 path.

The present invention solves this problem by reserving a (one-half rate or 32 kb/s) portion of one of the overall plurality of N available (DS0) channels of the M T-1 paths for the exclusive transport of out-of-band signaling information for each of N 'clear' DS0 communication channels of all of the M paths. Namely, the N DS0 communication channels are comprised of the full bandwidth of each of the DS0 communication channels of M-1 DS1 paths, all but one (23 out of 24) of the DS0 channels of one of the DS1 paths, as well as a reduced bandwidth (one-half rate or 32 kb/s) channel of the one DS0 channel from which the (one-half rate) signaling portion has been reserved.

Figure 2:
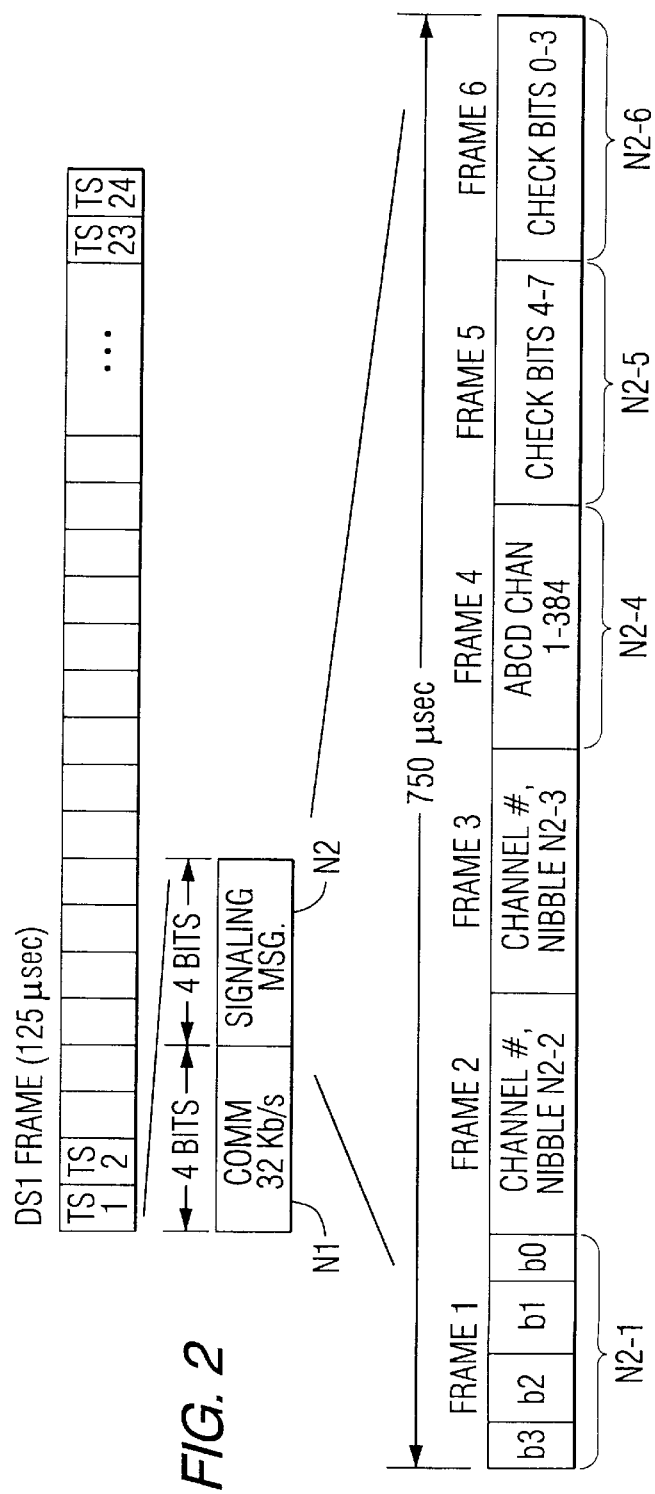
FIG. 2 diagrammatically illustrates the subdivision of a DS0 channel into an out-of-band, sub-rate DS0 signaling channel and an out-of-band, sub-rate DS0 communication channel.

The manner in which a selected one of the N DS0 communication channels of the M available (T-1 data rate) communication paths 30 is subdividable into a first, out-of-band, sub-rate signaling channel and a second, out-of-band, sub-rate DS0 communication channel in accordance with the invention is diagrammatically illustrated in FIG. 2. As shown therein, for a respective one of the N DS1 frames, the eight bits of a selected time DS0 slot (TS), such as time slot TS1, as a non-limiting example, are divided into a pair of four-bit nibbles N1 and N2.

The four bits of one of the two nibbles (e.g., four most significant bits (MSBs) of the time slot TS1—which make up the first nibble N1) are employed as a sub-rate, out-of-band 32 kbps communication channel, while the four bits of the other of the two nibbles (e.g., the four least significant bits (LSBs) of time slot TS1—which make up the second nibble N2) are employed to generate as a multi-nibble, sub-rate, out-of-band 32 kbps signaling message channel.

Namely, a signaling channel message for a respective one of the (N=384) communication channels of the M T-1 data paths comprises a plurality of successively transmitted signaling channel nibbles of the subdivided DS0 communication channel. As a non-limiting example, FIG. 2 shows the format of a signaling channel message—termed a signaling message block (SMB)—as being derived from six signaling channel nibbles of the time slot TS1 for six consecutive DS1 frames Frame 1–Frame 6, yielding a total of twenty-four bits per sub-rate DS0 signaling channel message. It should be observed, however, that the number of bits and the format of the sub-rate DS0 signaling channel message described herein is given as a non-limiting example, as is not intended to be restrictive of the invention. The use of a twenty-four bit message format allows one complete signaling channel message to be transported every six DS1 frames or 750 $\mu$sec. For the parameters of the present example, this means that all 384 channels can be serviced every 750×384 $\mu$sec (or every 288 msec). For the six nibble composite message format of the SMB shown in FIG. 2, the first nibble N2-1 may include a start of message bit b3 in the LSB position, an unused bit b2, a service channel request bit b1, and the MSB of the channel number bit in bit position b0. The use of the MSB b0 of the first nibble N2-1 is to provide the ninth bit of a nine bit channel address space, the remaining eight bits of which are supplied by the second and third nibbles N2-2 and N2-3. A nine bit address space will provide up to 512 channel addresses, which is sufficient to accommodate the 384 DS1 channels of the present example. The fourth nibble N2-4 of the sub-rate DS0 signaling channel message is used to convey the actual signaling data (respective ABCD-equivalent signaling bits), while the fifth and sixth nibbles N2-5 and N2-6 of the signaling channel message are employed to transport an eight-bit forward error correction (FEC) code.

Figure 3:
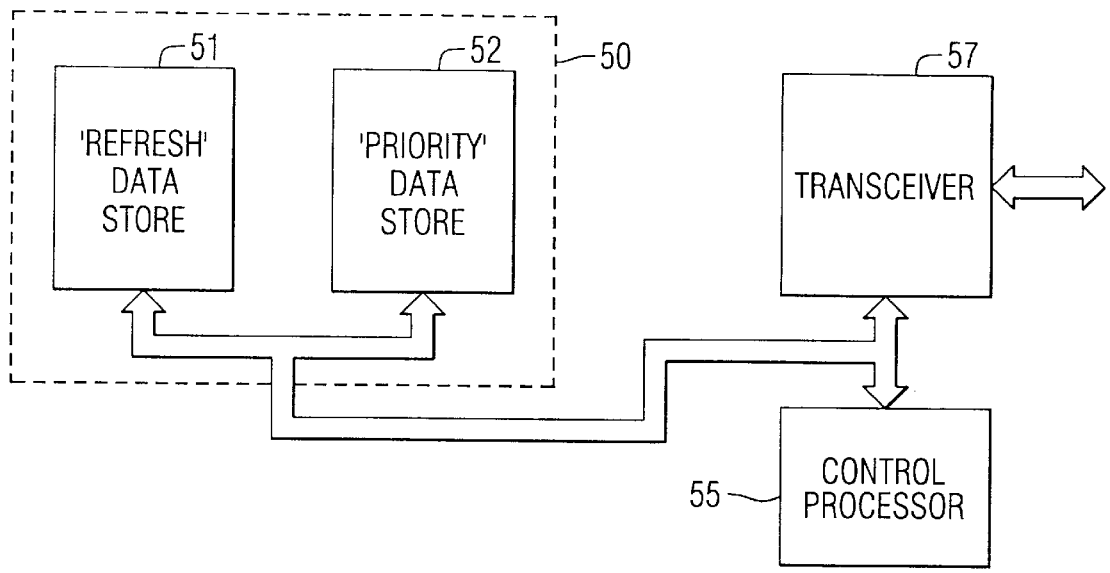
FIG. 3 diagrammatically illustrates allocation of message buffer space of a communications transceiver control processor for storage of 'priority' and 'refresh' mode signaling channel messages for implementing the out-of-band, sub-rate DS0 signaling channel mechanism of the present invention.

FIG. 3 diagrammatically illustrates the manner in which the message buffer space employed by the communications control processor of a channel unit transceiver installed within an equipment shelf at a terminating station of a multipath digital telecommunication link, such as the M T-1 path network shown in FIG. 1, referenced above, may be allocated for the storage of 'priority' and 'refresh' mode signaling channel messages for implementing the out-of-band signaling channel mechanism of the present invention. As shown in FIG. 3, two data store sections 51 and 52 of a signaling message memory 50 are employed, each data store section containing sufficient memory to store signaling channel information for each telecommunication entity associated with the total communication channel capacity of the M TDM paths 30 of the system.

The first data store section 51 is used as a 'refresh' data memory for storing first information representative of the current signaling state of each of the (up to N) signaling entities. The second data store section 52 is used as a 'priority' queue for storing second information representative of only changes in signaling states of the signaling entities current state information for which is stored in the first data store section 51. From a practical standpoint, the priority queue 52 may be considerably smaller than the refresh memory 51, since it stores a relatively small number of entries, e.g., six entries.

In the absence of a change in signaling state of a respective signaling entity, there is no associated entry in the data store section 52. However, in response to a change in the signaling state information for a respective entity stored in data store section 51, that new signaling state information is transferred to the priority queue 52 for immediate servicing or priory transport over the out-of-band signaling message channel. Signaling messages are stored in the priority queue in the order received, so that oldest signaling channel requests will be serviced first. All changes are also made to the refresh queue 52, since a missed priority message will eventually be rectified in the refresh cycle.

Figure 4:
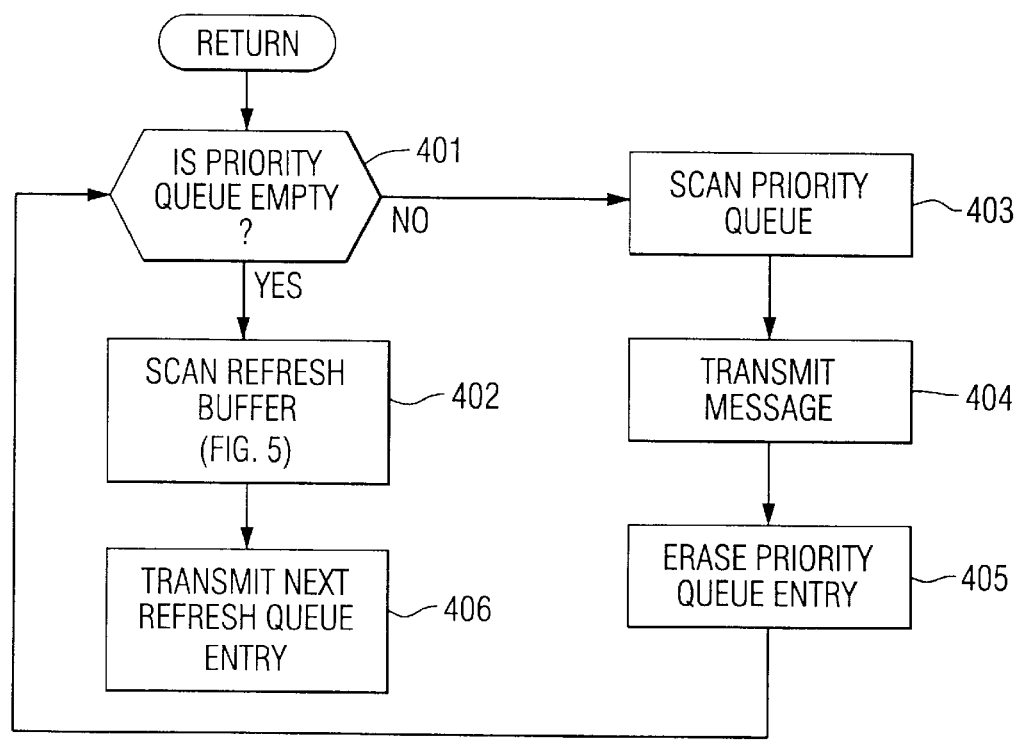
FIGS. 4 and 5 are flow charts of a non-limiting example of a routine executable by the communications control processor of a respective station channel unit transceiver for implementing the signaling channel mechanism of the invention.
Figure 5:
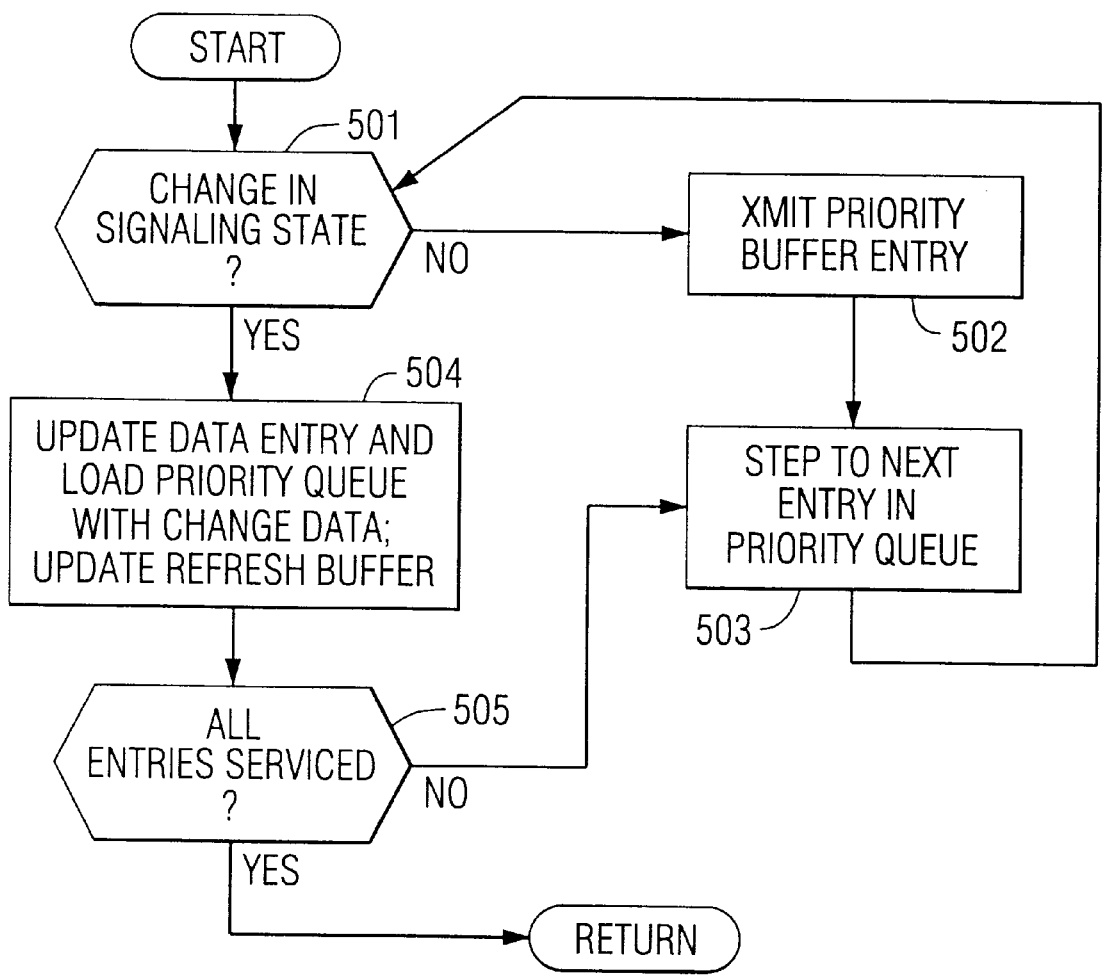

A non-limiting example of a sequence of steps that are executable by the communications control processor 55 for a respective station channel unit transceiver 57 for implementing the signaling channel mechanism of the invention is shown in the flow charts of FIGS. 4 and 5. In the signaling message assembly and transmission control sequence shown in FIG. 4, at an initial query step 401, the contents of the priority queue or second data store section 52 are examined to determine whether that memory section contains any new signaling messages awaiting service. The manner in which new signaling messages are loaded into the priority queue will be detailed below with reference to FIG. 5.

As long as the priority queue 52 contains no new signaling messages (the answer to query step 401 is NO), the contents of the current signaling state data store section 51 are sequentially and repeatedly scanned in step 402 for the generation of 'refresh' signaling messages. The next entry in refresh queue 52 is transmitted in step 406. However, if the priority queue 52 contains one or more signaling messages (the answer to query step 401 is YES), the routine transitions to step 403, wherein each signaling message in the priority queue is serviced in the order listed. The data associated with a priority change-in-state message for a respective signaling entry awaiting service in the priority queue is the current signaling state information (ABCD bits) for that entry stored in the priority queue 52. In step 404, each priority signaling message entry awaiting service in the priority queue 52 is transmitted in the out-of-band DS0 channel, using the signaling channel message block format described above and shown in FIG. 2.

Then, once a respective signaling channel message has been transmitted in step 404, its associated entry is erased from the priority queue 52 in step 405, and the routine loops back to query step 401. When all signaling channel requests in the priority queue 52 have been serviced (the answer to query step 401 will be YES), the routine transitions to step 402, wherein the 'refresh' mode signaling is executed.

The manner in which priority change of state of signaling state entries are generated and stored in the priority queue 52 is shown in the flow chart of FIG. 5. In an initial query step 501, for each signaling entity examined in the data store 51 during scan step 402, described above, the currently received signaling information (ABCD bits) from either the network side or the customer premises equipment is compared with the signaling information stored for that signaling entity, to determine if there is a change in its signaling state. As long as there is no change in the signaling state for a respective signaling entity of interest (the answer to query step 501 is NO), a refresh message is transmitted for that entry in step 502, the routine steps to the next entry in data store section 51 in step 503, and then loops to step 501. The data associated with a refresh message for a respective signaling entry is the current signaling state information (ABCD bits) for that entry stored in the data store section 51. As in the case of a priority signaling message described above, a refresh signaling message is transmitted in the out-of-band DS0 channel, using the signaling channel message block format described above and shown in FIG. 2. However, if the received signaling information differs from that stored in the data store section 51 (the answer to query step 501 is YES), the new signaling information is updated in the data store section 51, and is also loaded into priory queue data store section 52 in step 504. Also, the refresh buffer is updated. The routine of FIG. 5 then transitions to query step 505 to determine whether all of the signaling entries have been serviced. If the answer to query step 505 is NO, the routine transitions to step 503. If the answer to query step 505 is YES, the routine returns to the entry point of step 401 of FIG. 4.

At the terminating end of the transmission equipment, the SMB messages are re-assembled and local signaling tables are updated by channel number (1–384). No distinction is indicated or made between priority or non-priority received SMB's.

As will be appreciated from the foregoing description, the present invention successfully obviates the above described shortcomings of conventional robbed bit signaling channel mechanisms by expropriating a portion of one of the N available DS0 channels for the exclusive transport of out-of-band signaling information for all of the DS0 communication channels, and using the remaining bandwidth of that same DS0 channel as an out-of-band, sub-rate data communication channel. As no in-band, robbed bit signaling channel is employed, each of the (N-1) full-rate DS0 channels and the one sub-rate DS0 channel is a 'clear' DS0 communication channel.

While I have shown and described several embodiments in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. For use with a telecommunication system having a multiplicity M of digital time division multiplex (TDM)

communication paths linking a first site with a second site, each TDM communication path having a plurality of N communication channel associated time slots, and wherein a plurality of signaling entities are coupled to said second site, a method for conveying signaling information associated with the operation of any of said plurality of signaling entities from said first site to said second site comprising the steps of:

(a) reserving a portion of the available bandwidth of one of said N communication channels for the transport of signaling information;

(b) storing information representative of the signaling state of each signaling entity; and (c) in response to new information being stored in step (b) for any signaling entity, transmitting a message containing said new information and the identification of said any signaling entity in said portion of the available bandwidth of said one of said communication channels reserved in step (a).

2. A method according to claim 1, wherein step (c) comprises storing a signaling bit pattern representative of said new signaling state information separate from the storing of information in step (b), and transmitting said signaling bit pattern in said message.

3. A method according to claim 1, wherein step (a) comprises reserving a first portion of said available bandwidth of said one of said N communication channels for the transport of said signaling information, and employing a second portion of said available bandwidth of said one of said N communication channels as a sub-rate communication channel.

4. A method according to claim 2, wherein said message comprises a plurality of bits including prescribed control bits, an address bit pattern representative of the identification of said active signaling entity, said signaling bit pattern, and a forward error correction code bit pattern.

5. A method according to claim 1, wherein step (c) comprises, in the absence of new information being stored in step (b) for any signaling entity, transmitting a refresh message containing information representative of the current signaling state of and the identification of said any signaling entity in said portion of the available bandwidth of said one of said communication channels reserved in step (a).

6. A method according to claim 1, wherein step (c) comprises transmitting respective sub-components of said message in a signaling channel portion of a time slot associated with said one of said communication channels during a plurality of successive frames of said communication channels.

7. A method according to claim 1, wherein step (b) comprises storing first information representative of the current signaling state of signaling entities in a first data store and, in response to a change in the signaling state of any of said signaling entities, storing second information representative of a new signaling state of said any of said signaling entities in a second data store.

8. A method according to claim 7, wherein step (c) comprises:

(c1) examining said second data store for the presence of a second information; and (c2) in response to detecting said second information in step (c1), transmitting said message containing said second information and the identification of said any signaling entity in said portion of the available bandwidth of said one of said communication channels reserved in step (a).

9. A method according to claim 8, wherein step (c2) further includes, in response to said second data store containing no second information, transmitting an alternative message containing said first information of a respective signaling entity stored in said first data store, and the identification of said respective signaling entity in said portion of the available bandwidth of said one of said communication channels received in step (a).

10. A method according to claim 8, wherein step (c2) further includes replacing said first information stored in said first data store with said second information storage in said second data store, and removing from said second data store contained in said transmitted message.

11. For use with a telecommunication network having a plurality of time division multiplexed (TDM) communication channels for providing communication connectivity between a first site and a plurality of telecommunication devices served by a second site, a method of conveying signaling information associated with the operation of one or more of said plurality of telecommunication devices comprising the steps of:

(a) reserving a portion of the bandwidth of a selected one of said plurality of TDM communication channels for the transport of said signaling information, while maintaining the full bandwidth of every other one of said plurality of TDM communication channels for the transport of communication signals;

(b) storing, in a first data store, a plurality of first information entries representative of the current operational states of said plurality of telecommunication devices;

(c) in response to new information associated with a change in operational state of one or more of said telecommunication devices, storing, in a second store, a one or more respective second information entries representative of the new operational states of said one or more telecommunication devices;

(d) transmitting, in said reserved portion of the bandwidth of said selected one of said plurality of TDM communication channels, one or more first signaling messages containing said one or more respective second information entries stored in said second data store.

12. A method according to claim 11, wherein step (d) further comprises transmitting, in said reserved portion of the bandwidth of said selected one of said plurality of TDM communication channels, second signaling messages containing said plurality of first information entries stored in said first data store.

13. A method according to claim 11, wherein step (d) further comprises, for any telecommunication signaling device for which a second information entry has been stored in said second data store and transmitted in said reserved portion of the bandwidth of said selected one of said plurality of TDM communication channels, replacing the first information entry therefor in said first data store with said second information entry therefor stored in said second data store, and removing said second information entry therefor from said second data store.

14. For use with telecommunication system having a multiplicity M of digital time division multiplex (TDM) communication paths linking a first site with a second site, each TDM communication path having a plurality of N communication channel associated time slots, and wherein a plurality of signaling entities are coupled to said second site, a communications arrangement for transporting signaling information associated with the operation of any of said plurality of signaling entities from said first site to said second site comprising:

a first data store which stores first information representative of the signaling state of each signaling entity;

a second data store which stores second information representative of a change in signaling state for any signaling entity; and a processor-controller transceiver which is operative to transmit a signaling channel message containing said second information and the identification of said any signaling entity in a first portion of the available bandwidth of one of said N communication channels, a second portion of said available bandwidth being employed for the transport of a sub-rate communication channel.

15. A communications arrangement according to claim 14, wherein said signaling channel message comprises a plurality of bits including prescribed control bits, an address bit pattern representative of the identification of said active signaling entity, said signaling bit pattern, and a forward error correction code bit pattern.

16. A communications arrangement according to claim 14, wherein said processor-controller transceiver is operative, in the absence of second information being stored in said second data store, to transmit a refresh message containing information representative of the current signaling state of and the identification of said any signaling entity in said portion of the available bandwidth of said one of said communication channels.

17. A communications arrangement according to claim 14, wherein said processor-controller transceiver is operative to transmit respective sub-components of said signaling channel message in a signaling channel portion of a time slot associated with said one of said communication channels during a plurality of successive frames of said communication channels.

18. For use with telecommunication system having a multiplicity M of digital time division multiplex (TDM) communication paths linking a first site with a second site, each TDM communication path having a plurality of N communication channel associated time slots, and wherein a plurality of signaling entities are coupled to said second site, a communications arrangement for transporting signaling information associated with the operation of any of said plurality of signaling entities from said first site to said second site comprising:

a first data store which stores first information representative of the signaling state of each signaling entity;

a second data store which stores second information representative of a change in signaling state for any signaling entity; and a processor-controller transceiver which is operative to transmit a signaling channel message containing said second information and the identification of said any signaling entity in one of said N communication channels and, in the absence of second information being stored in said second data store, to transmit a refresh message containing information representative of the current signaling state of and the identification of said any signaling entity in said one of said communication channels.

19. A communications arrangement according to claim 18, wherein said processor-controller transceiver is operative to transmit said signaling channel message containing said new information and the identification of said any signaling entity in a first portion of the available bandwidth of said one of said N communication channels, a second portion of said available bandwidth being employed for the transport of a sub-rate communication channel.

* * * * *